United States Patent
Wilson et al.

(10) Patent No.: US 9,956,653 B2
(45) Date of Patent: May 1, 2018

(54) METHOD OF MAKING AN AEROFOIL CLADDING BODY

(71) Applicant: ROLLS-ROYCE PLC, London (GB)

(72) Inventors: Craig Wilson, Nelson (GB); Michael John Davey, Barrowford (GB); David Cowherd, Rawtenstall (GB); Stephen John Wilkinson, Barrowford (GB)

(73) Assignee: ROLLS-ROYCE plc, London (GB)

( * ) Notice: Subject to any disclaimer, the term of this patent is extended or adjusted under 35 U.S.C. 154(b) by 778 days.

(21) Appl. No.: 14/592,518

(22) Filed: Jan. 8, 2015

(65) Prior Publication Data
US 2015/0202723 A1    Jul. 23, 2015

(30) Foreign Application Priority Data

Jan. 20, 2014  (GB) .................................. 1400883.3

(51) Int. Cl.
*B23P 15/04*    (2006.01)
*B21D 53/78*    (2006.01)
(Continued)

(52) U.S. Cl.
CPC .............. *B23P 15/04* (2013.01); *B21D 53/78* (2013.01); *B23K 20/002* (2013.01); *B23K 20/02* (2013.01);
(Continued)

(58) Field of Classification Search
CPC .......... B23P 15/04; F01D 5/288; F01D 5/147; B23K 20/002; B23K 20/02; B21D 53/78; F04D 29/324
See application file for complete search history.

(56) References Cited

U.S. PATENT DOCUMENTS 2,615,236 A    10/1952   Curtiss
4,010,530 A    3/1977    Delgrosso et al.
(Continued)

FOREIGN PATENT DOCUMENTS

EP    2 281 645 A1    2/2011
FR    2 319 008 A1    2/1977

OTHER PUBLICATIONS

Nov. 27, 2015 Search Report issued in European Patent Application No. 15150314.
(Continued)

*Primary Examiner* — Moshe Wilensky
(74) *Attorney, Agent, or Firm* — Oliff PLC

(57) ABSTRACT

A method of manufacture of a cladding body for an edge of an aerofoil, the method including the step of providing a core member shaped to include an elongate recess portion for mounting on the edge of the aerofoil, the elongate recess portion being shaped across its width to define a smoothly curved concave surface. A support member is provided; the support member has a support portion for complementary engagement with the recess portion. Both the support member and the core member are arranged between a pair of opposing membranes. The core member is bonded to each of the pair of membranes to form an intermediate cladding body, wherein the recess portion of the core member is arranged to engage, at least during the bonding step, the support portion to be supported thereby. At least the membranes are shaped using a hot forming process.

17 Claims, 6 Drawing Sheets

(51) Int. Cl.
  *B23K 20/02* (2006.01)
  *F01D 5/14* (2006.01)
  *F04D 29/32* (2006.01)
  *B23K 20/00* (2006.01)
  *F01D 5/28* (2006.01)
  *B23K 101/00* (2006.01)

(52) U.S. Cl.
  CPC .............. *F01D 5/147* (2013.01); *F01D 5/288* (2013.01); *F04D 29/324* (2013.01); *B23K 2201/001* (2013.01); *F05D 2240/303* (2013.01); *F05D 2240/304* (2013.01); *Y10T 29/49321* (2015.01); *Y10T 29/49337* (2015.01)

(56) References Cited

U.S. PATENT DOCUMENTS

| | | | |
|---|---|---|---|
| 2003/0154586 A1* | 8/2003 | Nicholson | B21D 26/055 29/421.1 |
| 2011/0023301 A1* | 2/2011 | Jones | B21D 26/055 29/889.71 |
| 2012/0021243 A1 | 1/2012 | Kray et al. | |
| 2012/0233859 A1 | 9/2012 | Cattiez et al. | |
| 2012/0317810 A1 | 12/2012 | Klein et al. | |
| 2013/0008027 A1 | 1/2013 | Franchet et al. | |

OTHER PUBLICATIONS

Jul. 16, 2014 Search Report issued in Great Britain Application No. GB1400883.3.

* cited by examiner

METHOD OF MAKING AN AEROFOIL CLADDING BODY

FIELD OF THE INVENTION

The present invention relates to a method of manufacture of a cladding body for an edge of a bladed body, in particular for a turbine engine blade, especially a fan blade.

BACKGROUND

It is known to provide a cladding body on the leading or trailing edge of blades, e.g. fan blades, in turbine engines; especially in gas turbine engines.

Such a cladding body provides a shield, typically along the entire length of an edge of the blade. The edge may be the leading or the trailing edge of the blade. The leading edge is located upstream, and the trailing edge is located downstream, when the engine is in use.

Cladding bodies are used to provide impact protection for the blade itself, for example against debris or bird strike. The blade may be formed of a composite material which is not able to withstand high energy impacts; indeed it may be hollow. Thus, the risk of damage to the blade often necessitates the use of a cladding body to provide sufficient shielding from such impacts, and may also provide some erosion protection to the blade.

Prior art cladding bodies typically exhibited a square bottomed slot at the root of the body, for example such as that shown in FIG. 3. The square bottomed slot geometry is problematic however, because it creates regions of high stress at the square corners susceptible to failure at relatively low impact energies.

US2012/0317810 discloses a method which eradicates the square bottomed slot at the root of the body. However, the process may result in other problems in the resultant cladding body, for example due to the exceptionally high level of deformation required by the superplastic formed membrane to conform in the region indicated by reference numeral 31 in FIG. 6 of US2012/0317810. Indeed, the amount of superplastic forming required to deform the planar metal sheet 60 of US2012/0317810 to conform to the insert 41 and blank 51 of US2012/0317810 may result in significant uneven material thickness of the cladding body.

Certainly, a significant amount of the material present in the original planar metal sheet 60 of US2012/0317810 will be wasted. Indeed, from e.g. FIGS. 5 and 6 of US2012/0317810 it is conceivable that in excess of 50% of the original material of planar metal sheet 60 of US2012/0317810 may be wasted.

SUMMARY OF THE INVENTION

Thus, the present disclosure aims to provide a method of forming a cladding body for e.g. a turbine engine blade which does not result in a square bottomed slot at the root of the body, but which also alleviates the problems associated with the method of US2012/0317810.

Accordingly, the present disclosure provides a method. Advantageously, the amount of (expensive) material wasted is reduced relative to the prior art methods, whilst providing a cladding body with an improved internal geometry providing increased resistance to fatigue and impact stress.

Further, whereas in US2012/0317810 the inspection of the bond line will be very difficult, because the bond curves over the leading edge radius, the bond line is more easily inspected in a cladding body formed according to the present disclosure.

Furthermore, the claimed method does not introduce into the root of the cladding body any significant adverse stresses or strains as a result of the hot forming step. The root can be machined prior to, and after, the bonding and hot forming steps to provide the desired shape. This can be contrasted with the likely introduction of stresses and strains into the SPF membrane as it is draped over insert 41 of US2012/0317810 in the prior art method referenced above. Thus, a stronger body capable of withstanding an increased level of fatigue and impact stress is provided by the present disclosure.

Further still, the uniformity of thickness of the membranes in the resultant cladding body is more readily controllable, as the extent of deformation caused by the hot forming process (e.g. a super plastic forming process) is considerably less than in the recognized prior art method referenced above.

The bonding step may be performed before the shaping (hot forming) step. Advantageously, it is therefore only necessary to use the hot forming step to shape the membranes.

The bonding step may include a diffusion bonding process. Thus, high temperatures and pressures will be required. Advantageously, the support portion of the support member ensures that the recess portion maintains the desired shape throughout and beyond the bonding step, e.g. the diffusion bonding process. Consequently, the root portion of the final cladding body is shaped to define a smoothly curved concave slot (e.g. extending around at least a portion of the edge of the aerofoil), thereby eliminating the areas of high stress exhibited by the square cornered slot geometry in the prior art. The present disclosure therefore provides a more robust and reliable cladding body.

The bonding step may include heating at least a portion of the core body and/or one or both membranes to above 750 degrees Celsius.

The recess portion may be elongate. The (elongate) recess portion may be referred to as a groove.

The hot forming process may include: arranging the integral body in a cavity mould, and inflating the cladding body to deform at least the membranes to conform to the constraints of the cavity mould (e.g. a closed die). For example, the hot forming process may be a superplastic forming process, or a creep forming process. Advantageously, a creep forming process requires less strain to be applied to the membranes, resulting in less thinning of the membranes than a superplastic forming process.

The cavity mould may be a closed die, in which a hollow cavity body is expandable to conform to the shape of the closed die.

The core member and support member may be arranged to be laterally adjacent to one another between the pair of membranes so that, the support portion may engage the correspondingly shaped recess portion. Thus, each of the core member and support member may engage with each of the respective membranes.

The surface of the support member may be configured to prevent bonding of the support member with the core member and with each membrane during the bonding step. For example, the surface of the support member may be provided with a coating which prevents bonding of the support member with the core member and with each membrane during the bonding step. The method may include the step of coating the support member with the coating. Thus, the support member is removable from the final cladding body.

For example, the method may include the step of, after the steps of bonding and shaping, removing a portion of the cladding body to allow the support member to be removed. The method may also include the step of removing the support member from the cladding body.

To improve yield, a plurality of cladding bodies may be formed according to the present disclosure by executing the method only once. For example, the method may include the steps of: providing a further core member shaped to include a further recess portion for fitting around the edge of the aerofoil; providing a further support member having a further support portion for complementary engagement with the further recess portion; arranging the support members and the core members between a pair of opposing membranes; bonding each core member to each of the pair of membranes, wherein the recess portion of each core member is arranged to engage, at least during the bonding step, a respective support portion of the support portions to be supported thereby; and shaping at least the membranes using a hot forming process.

Thus, a pair of support members may be provided, each for a respective core member. The support members and core members may be arranged between a pair of opposing membranes. The support portions of the respective support members may be arranged to face in opposite and outward directions with respect to one another, to engage the respective recess portion of their corresponding core member. After execution of the method, dividing the resulting body into two, e.g. along the interface between the two support members, can provide respective cladding bodies.

However, a single support body with a pair of (e.g. outwardly facing, opposing) support portions could be provided. Thus the support member and further support member may be provided as an integral support body providing the respective support portions. For example the respective support portions may be located on opposing faces of the integral support body.

Thus, each time the method is executed in a single cycle, a pair of cladding bodies can be produced. This advantageously reduces the manufacturing time with respect to the prior art. The pair of resultant cladding bodies may be identical, or they may be different.

The edge may be the leading edge of the aerofoil. The edge may be the trailing edge of the aerofoil. The aerofoil may be a turbine engine blade.

In an adaptation, the method of manufacture of a cladding body for an edge of an aerofoil may include the steps of: providing a core member shaped to include a recess portion for complementary engagement with the edge of the aerofoil; providing a support member having a support portion assuming the shape of the edge of aerofoil; arranging both the support member and the core member between a pair of opposing membranes; bonding the core member to each of the pair of membranes, wherein the recess portion of the core member is arranged to engage, at least during the bonding step, the support portion to be supported thereby; and shaping at least the membranes using a hot forming process.

To improve yield, a plurality of cladding bodies may be formed according to the present disclosure by executing the method only once. For example, the method may include the steps of: providing a further core member shaped to include a recess portion for complementary engagement with the edge of the aerofoil; providing a further support member having a further support portion assuming the shape of the edge of the aerofoil; arranging the support members and the core members between a pair of opposing membranes; bonding each core member to each of the pair of membranes, wherein the recess portion of each core member is arranged to engage, at least during the bonding step, a respective support portion of the support portions to be supported thereby; shaping at least the membranes using a hot forming process.

The membranes may alternatively be referred to as skins.

The present disclosure also provides a process of assembling a reinforced turbine engine blade, the process including the described method and the step of mounting the resulting cladding body on to the turbine engine blade.

Furthermore, the present disclosure provides a process of assembling a gas turbine engine, the process including the described method and the step of incorporating the cladding body into the gas turbine engine.

Furthermore, the present disclosure provides a process of assembling a gas turbine engine, the process including the process of assembling a reinforced turbine engine blade, and the step of incorporating the reinforced turbine engine blade into the gas turbine engine.

BRIEF DESCRIPTION OF THE DRAWINGS

Embodiments of the invention will now be described by way of example with reference to the accompanying drawings in which:

FIG. 2b shows a cross-section of the leading edge of the fan blade and the cladding body of FIG. 2a;

DETAILED DESCRIPTION

Figure 1:
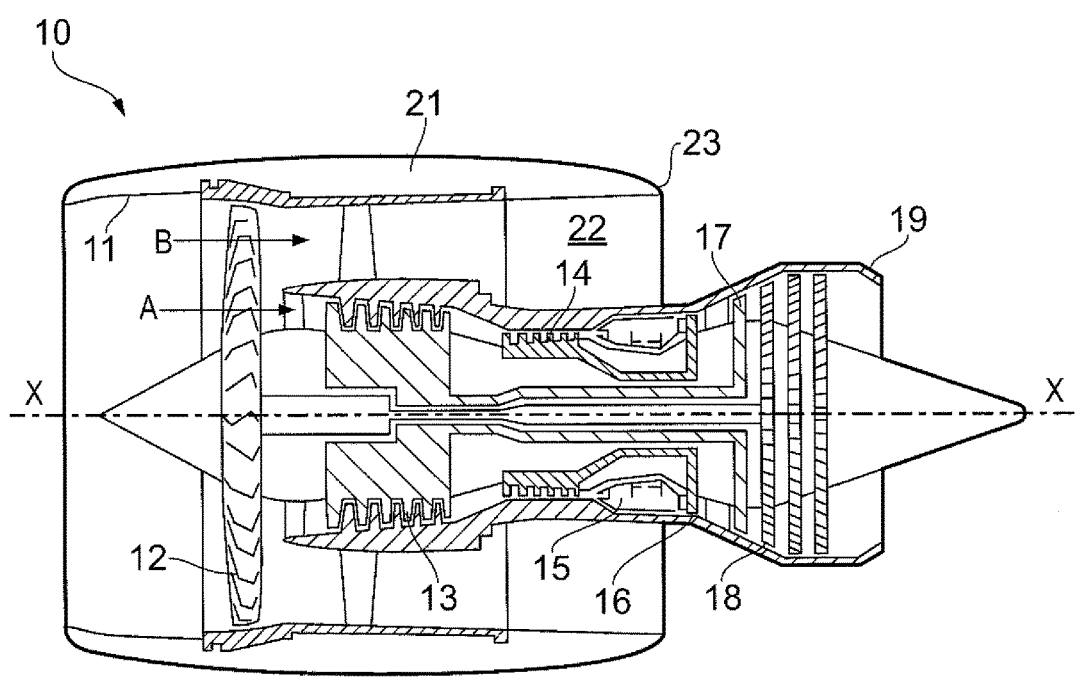
FIG. 1 shows a ducted fan gas turbine engine in which a blade edge cladding body is usable.

With reference to FIG. 1, a ducted fan gas turbine engine incorporating e.g. a fan blade having a cladding body produced according to the disclosure is generally indicated at 10, and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2A:
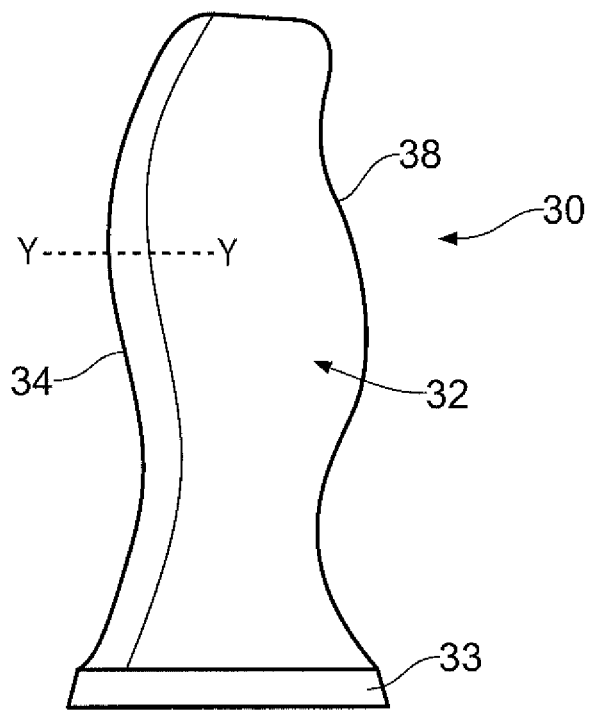
FIG. 2a shows a turbine engine fan blade incorporating a cladding body on its leading edge.
Figure 2B:
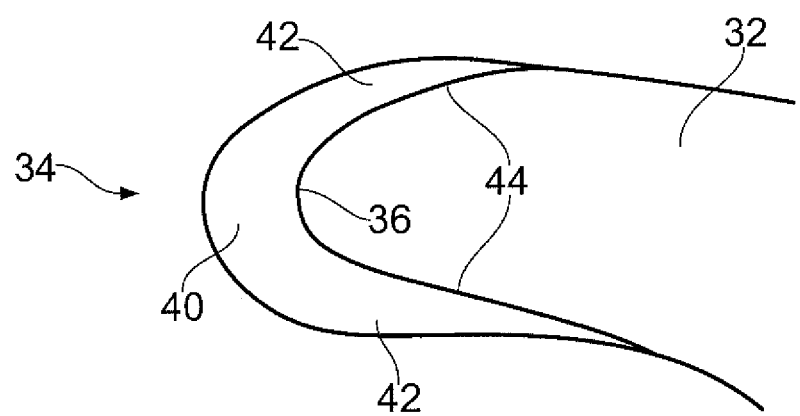

FIG. 2*a* shows an aerofoil assembly 30 which could be, for example, a fan blade assembly for a turbine engine. FIG. 2*b* shows the cross-section Y-Y in FIG. 2*a*.

Aerofoil assembly 30 includes an aerofoil 32 (for example a fan blade for a turbine engine) and a cladding member 34 e.g. providing impact protection for the aerofoil 32.

Aerofoil 32 provides a leading edge 36 and a trailing edge 38. In use, the leading edge is located upstream of the trailing edge with respect to the gas flow across the aerofoil 32. The cladding member 34 typically extends along at least a portion of, and optionally all of, the length of the leading edge.

Aerofoil 32 may include a foot 33, providing a means for attaching the aerofoil to a hub member (not shown). The cladding member 34 does not typically extend to cover a portion of the foot of the aerofoil.

The cladding member 34 is provided to protect the aerofoil 30. The protection may be primarily to shield the aerofoil from impacts. However, the cladding member 34 may be present to provide erosion resistance to the aerofoil. For example, the aerofoil may be formed of a composite material such as e.g. carbon fibres in a resin matrix, and therefore may benefit from e.g. a metallic cladding body to help resist erosion. Nevertheless, the aerofoil may be formed of metal, for example a metallic alloy, or other materials.

The cladding member 34 is typically metallic. It may be formed of an alloy, e.g. a titanium alloy. The cladding member may be formed of titanium. The material for the cladding member is typically expensive.

To enhance the resilience of the cladding member 34 to fatigue and impact damage, the internal surface of the cladding member 34 may conform generally to the shape of the aerofoil.

The cladding member 34 includes a root portion 40 and wing portions 42. The inner face of root portion 40 may generally conform to the shape of the edge of the aerofoil. However, it is not necessary for the inner face of root portion 40 to conform precisely to the shape of the edge of the aerofoil, because the cladding member 34 is typically bonded to the aerofoil. Thus, any significant differences in form can be accounted for by the presence of the bonding material—for example, an epoxy or other suitable adhesive. The inner face of each wing portion 42 may conform to a respective face 44 of the aerofoil 32.

A method of manufacture of a cladding member 34 will now be disclosed.

Figure 4:
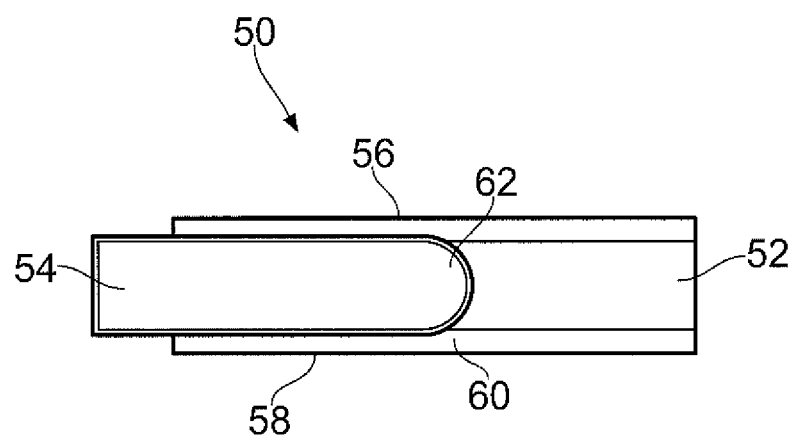
FIG. 4 shows an example of an assembly for use according to the present disclosure.

Cladding member assembly 50 is provided as a stack of respective components shown schematically in FIG. 4.

Assembly 50 includes a root member 52 and a support member 54. The root member 52 and support member 54 are arranged to be laterally adjacent to one another to be sandwiched by a pair of opposing wing members 56, 58. Each wing member 56, 58 is in contact with the root member 52. Each wing member 56, 58 may also be in contact with the support member 54.

The stack is seen in partial cross section to demonstrate the principle of the disclosure. In practice, the wing members 56, 58 would extend laterally beyond the support body 54. Typically, the support member 54 is enveloped by bodies, so that the diffusion bonding process described below results in a sealed body which envelopes the support body 54.

The root member 52 includes an elongate recess 60 formed along its length. Recess 60 may be thought of as a groove. Recess 60 is formed to conform generally (or precisely) to the shape of the relevant edge (e.g. the leading edge) of the aerofoil it is intended to be mounted on. Recess 60 may be formed by machining the root member 52 or by moulding or casting the root member 52 for example. Other methods of forming a suitable recess may be used.

Recess 60 is typically elongate. Across its width the recess is defined by a smoothly curved concave surface. The concave surface may be formed of a partial radius. The concave surface may be formed of one or more (partial) radii, so as to provide the smooth curvature. The concave surface may vary in depth along the length of the recess 60.

Support member 54 includes a (proud or convex) support region 62 matching closely the shape of the recess 60. In other words the support region 62 and recess 60 are complementary; they engage cooperatively. Optionally, they engage cooperatively along the entire length of the recess 60.

Thus, the shape of the support portion 62 of support member 54 complements the recess formed in the root member 52. At least during the bonding process, described below, the support portion 62 mates with the recess 60 to provide structural support and to prevent unwanted deformation, or collapse, of the recess 60. However, the support portion 62 may mate with the recess in this way throughout the entire process, not only during the bonding process, until the support member 54 is removed.

Support portion 62 may be an elongate support portion, extending generally along the length of the support member 54, which may be an elongate support member 54.

Recess 60 in the root member 52 may be an elongate recess extending generally along the length of the root member 52, which may be an elongate root member 52.

In an exemplary embodiment, the recess is formed as a groove along a length of the root member 52. The groove may have a uniform cross-section along its length but it may vary, for example to match the profile of the relevant edge of the aerofoil on which the final cladding member is intended to be mounted, as discussed below.

Thus, the groove may be formed to include a section of a circumference when viewed in cross-section, i.e. when viewed along the long axis of the groove. The diameter defining the circumference may be larger than the thickness of the root member (the thickness of the root member being the dimension which is generally perpendicular to the long axis of the groove and generally parallel to the width of the groove; i.e. the dimension extending between the two wing members 56, 58 in the assembly 50). Small angular runouts may be provided to allow for any slight inaccuracies in the machining step to be accounted for and also to promote complete closure of the joints between the root member 52 and wing members 56, 58 during the bonding process.

In another exemplary embodiment, the recess may be formed to correspond precisely with the shape of the edge of the aerofoil, thus its shape may vary along the length of the recess. The support portion 62 therefore may assume the shape of the edge of the aerofoil on which the final cladding member 30 is intended to be mounted. Thus, the support region 62 may be a duplicate of at least a portion of the aerofoil, in particular a duplicate of at least a portion of an edge (e.g. a leading edge) of the aerofoil.

The root member 52 and the wing members 56, 58 are typically formed of the same material, e.g. metal, typically an alloy of titanium, so that they diffusion bond together to eliminate the respective interfaces between them.

The method includes the step of diffusion bonding the pair of wing members 56, 58 to the root member 52 to produce an integral intermediate body. This is achieved by applying sufficient temperature and pressure to the assembly. The skilled person knows how to successfully diffusion bond a stack of three bodies such as this to form an integral body.

To prevent the wing members 56, 58 and the root member 52 bonding to the support member 54, at least the portions of the support member 54 which are in contact with the wing members 56, 58 and root member 52 are optionally coated with a stop off material which inhibits diffusion bonding. A stop off material is a material which acts to prevent two (e.g. similar) materials from bonding to one another during a diffusion bond process.

Thus, the support member 54 may be formed of a core body having a stop off material formed thereon. The core body may be formed of commercially pure titanium or steel.

Accordingly, the core body is optionally coated with a stop off material, such as yttria (yttrium oxide).

Coating the support member 54 in a suitable stop off material will act to prevent the support member 54 from bonding with other component parts of the assembly 50, in particular the root member 52 and the wing members 56, 58.

To prevent the stop off material from entering the interfaces which are desired to be diffusion bonded (e.g. the interfaces between the wing members and the root member 52), the stop off material may be applied to the core body of the support member 54 in a binder or matrix. For example, yttria is typically provided in the form of a dry powder, and thus to apply it as a coating to the core body the yttria powder is suspended in a binder, for example an organic binder. Typically, the stop off material is provided in an organic suspension to facilitate quick drying and even application. For example, organic binders such as cellulose, clay or polyacrylate may be used. These binders allow adhesion of the stop off material to metal whilst also allowing the suspension to flow and therefore be applied accurately and evenly. For example, the organic binder facilitates the application of the stop off material, e.g the yttria, to the core body and helps to prevent the ingress of the yttria to the interfaces to be diffusion bonded.

The (e.g. organic) binder may be chosen to be a substance which can be burnt off by a curing process, by the application of high temperatures, to ensure that no contaminants remain in the joint regions before the bonding process begins.

The stop off material in suspension in an organic binder may be painted, sprayed or printed on to the relevant surface(s).

If desired, the core body itself may be oxidized to provide some (additional) resistance of the support member 54 to bonding to other component parts of the assembly 50. However, the resulting bonding inhibition effect is not as good as that provided by a stop off material coating, e.g. an yttria coating.

The application of the high temperatures and pressures to the assembly 50 during the diffusion bonding process are such that in the absence of the support member 54, the shape of the curved recess 60 would be altered. Indeed, in certain conditions, the curved recess can be expected to collapse.

Thus, according to the present disclosure the support member 54 provides the support region 62 to maintain the shape of recess 60 during the diffusion bonding process.

During the diffusion bonding process the edges of the wing members 56, 58 are bonded, e.g. diffusion bonded, to form a seal. Thus, after the bonding process, the support body 54 is contained within a sealed intermediate body.

For example, the wing members 56, 58 may each be bonded to an edge sealing member (not shown) sandwiched between them e.g. at the periphery of the wing members 56, 58.

The sealed intermediate body is then located in a female mould tool, i.e. it is located in a (closed) cavity die. The cavity of the female mould tool includes portions shaped similarly to faces 44 of the aerofoil. The sealed intermediate body is subject to a hot forming process, e.g. a creep forming process or a super plastic formation (SPF) process in which the sealed intermediate body is inflated to conform to the cavity of the female mould tool. This may be achieved by inputting a gas, e.g. an inert gas, to the interior of the sealed intermediate body. Or, this may be achieved by evacuating the cavity. In either case, the application of sufficiently high temperature to the intermediate body and the application of a sufficient pressure differential between the interior and exterior of the sealed intermediate body causes the body to conform to the cavity, and therefore to adopt the desired external shape.

Figure 5:
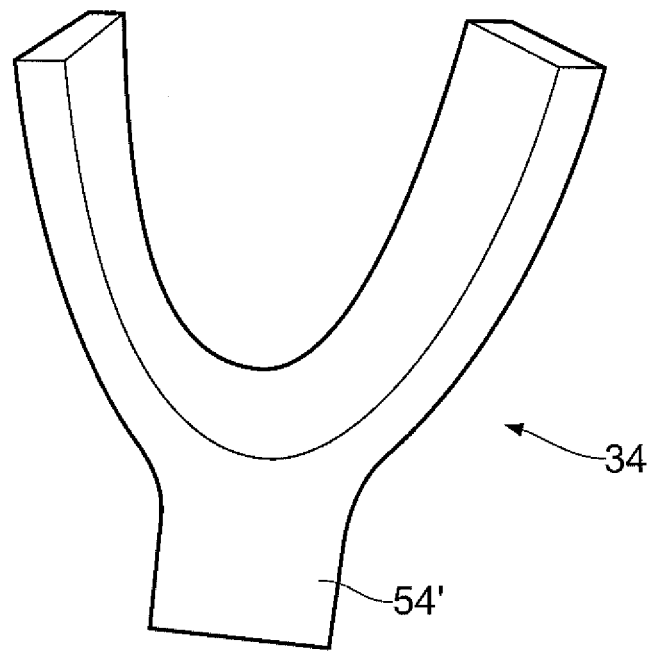
FIG. 5 shows an example of a cladding body fabricated according to the present disclosure.
Figure 5:
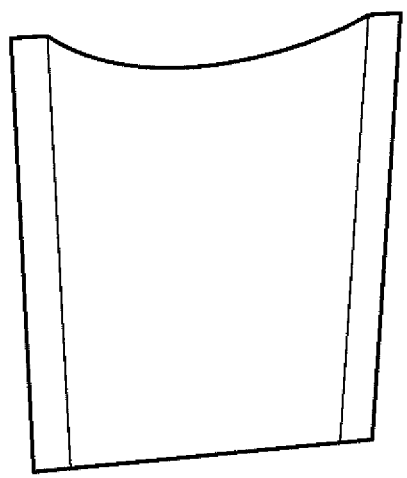

Subsequent to the bonding and forming processes, the intermediate body is cut open, for example by laser cutting. For example, the intermediate body is cut along its length on each of the wing members 56, 58 to provide an intermediate cladding member, a portion of which is shown in FIG. 5.

The support member 54 is removable from the interior of the intermediate cladding member by virtue of the presence of the stop off material. It is envisaged that the support member 54 will be discarded at this stage. However, with suitable reprocessing the support member may be reusable. For example, the coating may be removed, and reapplied and the resulting support member reused.

It is notable that in the absence of a coating of a stop off material, a support member formed of an oxidized core body is still removable from the intermediate cladding member. However, the absence of the stop off material means that the support body and the intermediate cladding member 34 form what is known in the art as a 'stuck joint'. This means that the support body and the intermediate cladding member have joined to some extent, but that they are separable without causing significant damage to the cladding member. In contexts other than gas turbine engines, where the final finish and dimensions of the cladding member are not so critical as that for a cladding body for mounting on an aerofoil for use in the turbine engine, the stop off material may be omitted and the core body may be oxidized instead.

Indeed, in any application, the core body of the support member may be oxidized in addition to being coated with a suitable stop off material. This will provide some protection against the core body bonding to another component part of the assembly 50 in the event that the core body is imperfectly coated with the stop off material such that a gap is present.

In any event, the intermediate cladding member 34 may be further machined and processed to obtain the required external shape and finish. For example, with reference to FIG. 5, it will typically be desirable to remove the unwanted portion 54' from the cladding member 34, e.g. by machining it off to produce the desired external shape of the cladding member.

Figure 3:
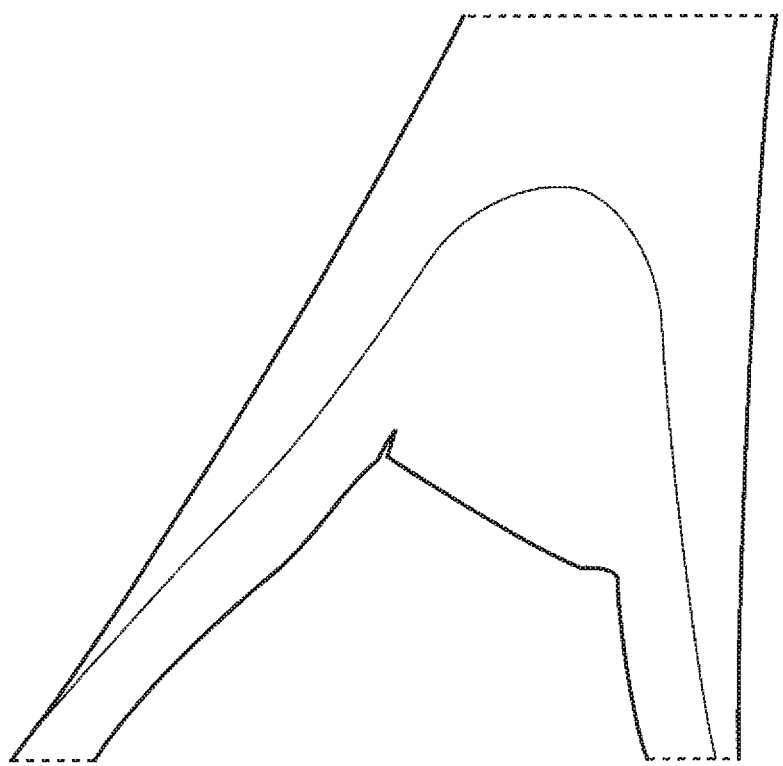
FIG. 3 shows an example of a prior art cladding body.

It will be appreciated that the above described method achieves advantages with respect to the prior art, in that the internal surface of the cladding member is formed to include a curved recess for receiving the edge of the blade on which it is to be mounted, so that the square slot present in the example shown in FIG. 3 is removed, leading to a structurally more robust cladding member; and in that the process itself wastes less material than the prior art method referenced above.

In particular, the present method eliminates the waste of the large amount of expensive cladding member material (e.g. the titanium or titanium alloy) by instead providing a sacrificial waste part (the support member 54) which is both smaller in volume and can be formed of comparatively less expensive material. Thus, the support member 54 may be formed of a different material to the root member 52 and/or the wing members 56, 58.

Figure 6:
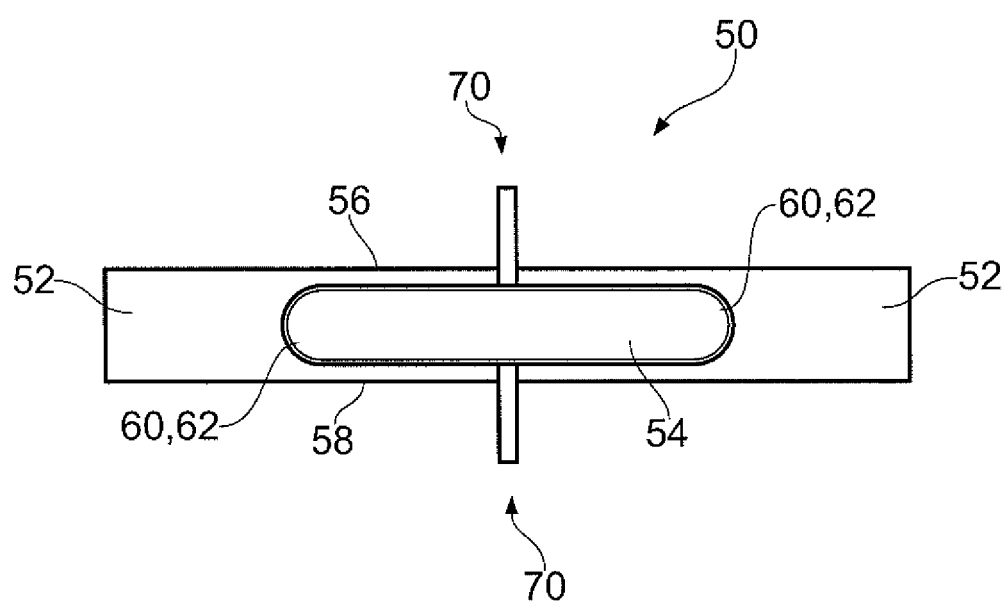
FIG. 6 shows an example of an alternative assembly for use according to the present disclosure.

In an exemplary embodiment, represented schematically in FIG. 6, a pair of root members 52 are provided in the assembly 50, between the wing members 56, 58. The assembly also includes a pair of support portions 62 for complementary engagement with the recesses 60 provided in the respective root members 52. Each support portion may be provided on a respective support body 54, arranged laterally adjacent each other, back to back so that the respective support portions face in opposite directions. Or, a single support member may be provided, having a pair of support portions 62, e.g. arranged on opposite faces.

The method is executed as described above. However, when cutting the intermediate a pair of intermediate cladding members is provided, one on the left hand side and one on the right hand side. For example, when laser cutting the intermediate body the cut may be made to be equidistant between the recesses 60 as shown by the cut lines indicated by reference 70.

The invention claimed is:

1. A method of manufacture of a cladding body for a leading edge of an aerofoil, the method including steps of:
providing a core member including an elongate recess, the elongate recess having a complementary shape that substantially mirrors a shape of the leading edge of the aerofoil and being configured to engage the leading edge of the aerofoil, the elongate recess extending along a width of the core member to define a smoothly curved concave surface of the core member;
engaging a support portion of a support member into the elongate recess of the core member forming complementary engagement with the elongate recess;
arranging both the support member and the core member between a pair of opposing membranes;
bonding the core member to each of the pair of membranes to form an intermediate cladding body, the elongate recess of the core member engaging and being supported by, at least during the bonding step, the support portion of the support member; and
shaping at least the pair of membranes using a hot forming process.

2. The method according to claim 1, wherein the bonding step is performed before the shaping step.

3. The method according to claim 1, wherein the bonding step includes a diffusion bonding process.

4. The method according to claim 1, wherein the bonding step includes heating at least a portion of the core body and at least a portion of each membrane of the pair of membranes to above 750 degrees Celsius.

5. The method according to claim 1, wherein the hot forming process includes:
arranging the intermediate cladding body in a cavity mould; and
inflating the intermediate cladding body to deform at least the pair of membranes to conform to constraints of the cavity mould.

6. The method according to claim 1, wherein the hot forming process is a creep forming process or a superplastic forming process.

7. The method according to claim 1, wherein the core member and the support member are arranged to be laterally adjacent to one another between the pair of membranes.

8. The method according to claim 1, wherein a surface of the support member is configured to prevent bonding of the support member with the core member and with each of the pair of membranes during the bonding step.

9. The method according claim 1, wherein:
a surface of the support member is provided with a coating that prevents bonding of the support member to the core member and to each of the pair of membranes during the bonding step; and
the method includes a step of coating the support member with the coating.

10. The method according to claim 1, further comprising, after the steps of bonding and shaping, removing a portion of the intermediate cladding body to allow the support member to be removed.

11. The method according to claim 1, further comprising:
providing a second core member shaped to include a second elongate recess for mounting on the, or another, leading edge of the, or another, aerofoil, the second elongate recess having a same shape as the shape of the elongate recess;
providing a second support member having a second support portion for complementary engagement with the second elongate recess;
arranging the support members and the core members between the pair of opposing membranes;
bonding each core member to each of the pair of membranes to form the intermediate cladding body, the respective elongate recess of each core member engaging and being supported by, at least during the bonding step, a respective support portion of the support members; and
shaping at least the pair of membranes using the hot forming process.

12. The method according to claim 11, wherein the support member and the second support member are provided as an integral support body providing the respective support portions.

13. The method according to claim 12, wherein the respective support portions are located on opposing faces of the integral support body.

14. The method according to claim 1, wherein the aerofoil is a blade of a gas turbine engine.

15. A process of assembling a reinforced blade for a gas turbine engine, the process including:
the method according to claim 14; and
a step of mounting the resulting cladding body on to the blade.

16. A process of assembling a gas turbine engine, the process including:
the method according to claim 1; and
a step of incorporating the cladding body into the gas turbine engine.

17. A process of assembling a gas turbine engine, the process including:
the process of claim 15; and
a step of incorporating the reinforced blade of the gas turbine engine having the cladding body mounted thereon into the gas turbine engine.

* * * * *